Figure 1:
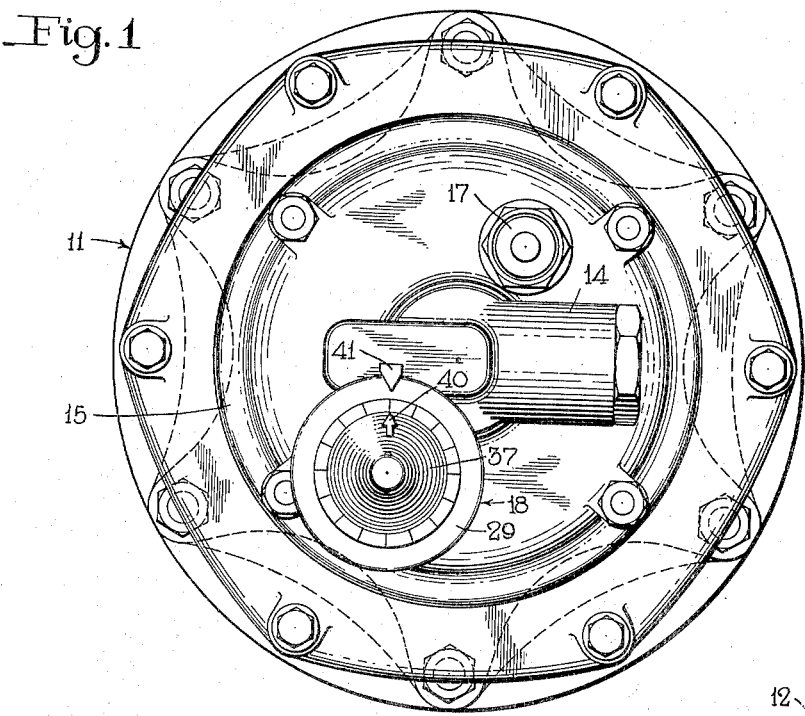

Feb. 6, 1951 G. K. NEWELL 2,540,754
ACCELEROMETER TESTING DEVICE
Filed Oct. 11, 1946 3 Sheets-Sheet 1

INVENTOR
George K. Newell
BY
Frank E. Miller
ATTORNEY

Feb. 6, 1951 — G. K. NEWELL — 2,540,754
ACCELEROMETER TESTING DEVICE
Filed Oct. 11, 1946 — 3 Sheets-Sheet 2

INVENTOR
George K. Newell
BY Frank E. Miller
ATTORNEY

Feb. 6, 1951 — G. K. NEWELL — 2,540,754
ACCELEROMETER TESTING DEVICE
Filed Oct. 11, 1946 — 3 Sheets-Sheet 3

INVENTOR.
George K. Newell
BY Frank E. Miller,
ATTORNEY

Patented Feb. 6, 1951

2,540,754

UNITED STATES PATENT OFFICE 2,540,754

ACCELEROMETER TESTING DEVICE

George K. Newell, near Pitcairn, Pa., assignor to The Westinghouse Air Brake Company, Wilmerding, Pa., a corporation of Pennsylvania Application October 11, 1946, Serial No. 702,862

4 Claims. (Cl. 73—1)

This invention relates to testing devices, and has particular relation to a portable pocket-size testing device adapted for use by relatively unskilled persons for the purpose of testing the performance and conformity to design specifications of a device known as a "Decelostat."

A "Decelostat" is a rotary inertia device attached to the end of the axle journal casing of a railway car truck, or mounted in any other suitable manner, so as to be operatively responsive to a predetermined rate of acceleration or deceleration of the car wheel or wheel axle for a desired purpose, such as the control of the brakes associated with the car wheels in a manner to prevent sliding or racing of the car wheels due to excessive brake application or excessive propulsion torque applied to the wheels. An example of the "Decelostat" is shown and described in the copending joint application of George K. Newell, the present applicant, and Joseph C. McCune, now Patent 2,447,710, assigned to the assignee of the present application.

Briefly, the "Decelostat" described in the above-mentioned Patent 2,447,710 comprises a fly-wheel rotatively mounted on a spindle journaled in a casing removably attached to the outer end of an axle journal casing, the spindle being connected to the car wheel axle in a manner to be driven by rotation of the axle. The flywheel is connected to the spindle through a flexible connection which provides a "floating zone" for the fly-wheel, that is, a certain angle through which the fly-wheel may rotate with respect to the spindle without any appreciable rotational resistance and which also provides for yieldingly resisted movement of the fly-wheel at the opposite extremities of the "floating zone" to a degree substantially proportional to the rate of rotative deceleration or the rate of rotative acceleration of the wheel axle. The flexible connection between the fly-wheel and the spindle is provided by a flat leaf spring, attached at one end to the rim of the fly-wheel and extending radially across the axis of rotation of the flywheel and terminating in a free end. The free end of the leaf spring is bent inwardly to provide a cam that cooperates with a pair of rollers mounted transversely on the spindle. Rotation of the spindle causes engagement of one or the other of the rollers with the cam on the end of the leaf spring, depending on the direction of rotation of the spindle, so as to cause rotation of the flywheel. Acceleration or deceleration of the flywheel is reflected in a varying degree of outward flexing of the leaf spring substantially proportional to the rate of deceleration or acceleration. A valve device, carried by the axle journal casing, has an operating plunger in coaxial relation to the spindle, the plunger having a normal axial clearance with respect to the leaf spring and being engaged by the leaf spring upon a predetermined outward flexing thereof to effect unseating of the valve device for a desired control purpose such as the control of brake cylinder pressure.

The "Decelostat" is so designed that unseating of the valve device is effected in response to deceleration or acceleration of the car wheels at a rate exceeding a certain rate which occurs only when the wheels are slipping or racing, such certain rate being for example 10 miles per hour per second.

In order to prevent the transversely mounted rollers on the spindle from flexing the leaf spring to such an extent as to run off the cam end of the leaf spring two suitable stops are provided in peripherally spaced relation for alternative engagement by the rollers depending upon the direction of rotation of the fly-wheel, following a certain degree of rotation of the fly-wheel with respect to the spindle after the valve device is first operated by outward flexing of the leaf spring.

The testing device constituting my present invention possesses the unique advantage of being able to check the sensitivity of the "Decelostat" to acceleration or deceleration without requiring actual operation of the "Decelostat," that is, it is adapted to test the sensitivity of the "Decelostat" to acceleration and deceleration statically and not dynamically. My novel testing device is of such small size as to be capable of being carried in a man's pocket. My testing device is moreover of such simplicity of construction and operation that a relatively unskilled person may be taught to use it in just a few moments.

My testing device has the additional advantage in that it enables a "Decelostat" to be tested, that is its performance verified, in just a few moments while the "Decelostat" is actually installed on a car without necessitating removal of the "Decelostat" from the axle journal casing. This is a tremendous advantage from the standpoint of convenience, as well as the saving in time and servicing expense relative to that which would otherwise be involved if removal of the "Decelostat" from the car for testing purposes were necessitated.

When testing a "Decelostat," following manufacture thereof, it is necessary not only to determine the rate of acceleration or deceleration at which operation of the valve device occurs but also to verify and check the conformity of the various parts of the "Decelostat" and their relative adjustments and clearances to design specifications.

For example, the thickness of the leaf spring may vary from specifications to such an extent as to undesirably affect the performance of the "Decelostat." Also, unless the contour of the leaf spring, that is the angle at which the free end is bent inwardly to form a cam, is in accordance with design specifications, the operating plunger of the valve device may be insufficiently operated to effect proper unseating of the valve device; or overflexing of the leaf spring may occur in which case the leaf spring may scrape on a stationary boss surrounding the operating plunger of the valve device.

Such defects in the conformity of the "Decelostat" to design specifications may be detected by measuring the amount of angular rotation of the fly-wheel with respect to the spindle following the initial unseating of the valve device, which amount of angular rotation should be within certain tolerance limits of a certain number of degrees if conformity to design specification exists. My testing device is so constructed and arranged as to enable the rotation of the fly-wheel with respect to the spindle following unseating of the valve device to be accurately determined.

It is an object of my invention to provide a method and apparatus for statically determining or verifying the response of a device to acceleration and deceleration.

It is another object of my invention to provide a portable pocket-size testing device of simple construction capable of use by persons of relatively little skill and training on a few moments of instruction.

It is another object of my invention to provide a method and apparatus capable of testing the performance and the conformity to specifications of a "Decelostat" while the "Decelostat" remains attached or mounted in its usual manner, without necessitating removal or dismounting thereof.

Figure 2:
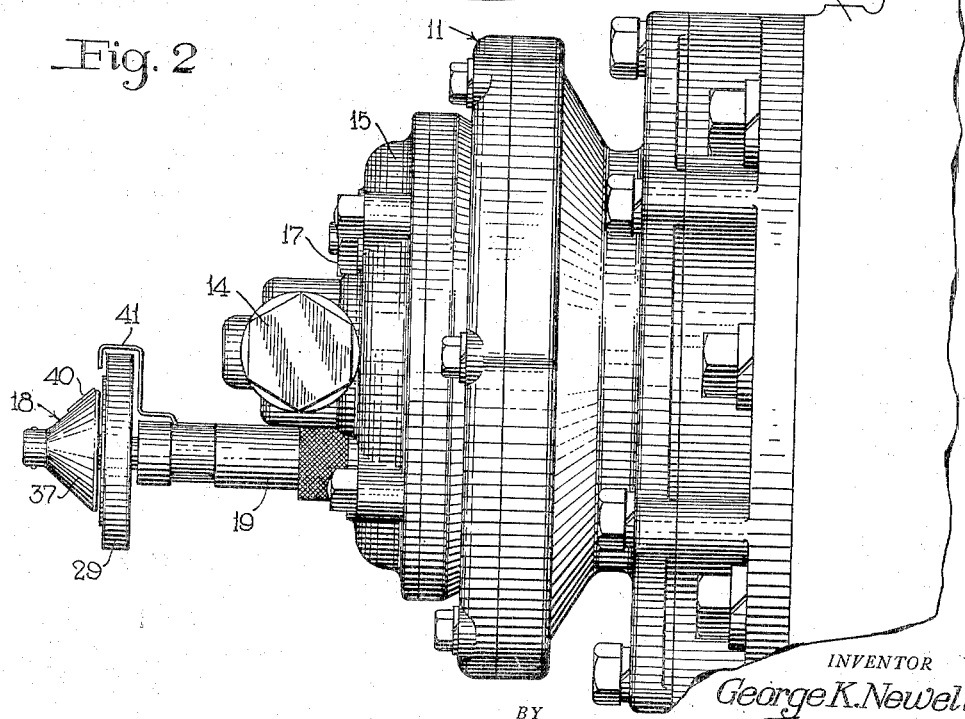
Figure 3:
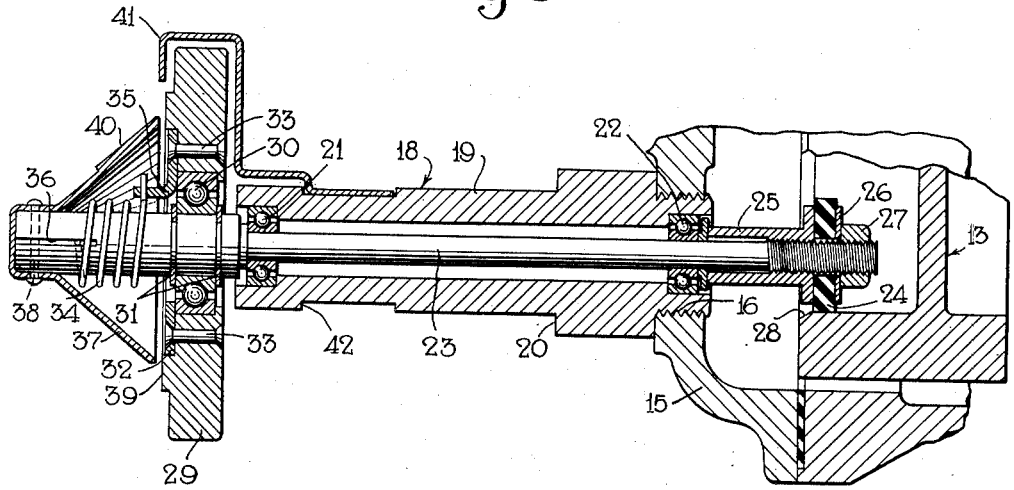

The above objects, and other objects of my invention which will be made apparent hereinafter, are attained by several embodiments of my invention subsequently to be described and shown in the accompanying drawings wherein Figure 1 is an end view of an axle journal casing having a "Decelostat" attached thereto and showing one embodiment of my novel testing device installed thereon, Figure 2 is an elevational view corresponding to Figure 1, Figure 3 is an enlarged fragmental sectional view, showing in substantially full size the details of the novel testing device in Figure 1 and the manner in which it is associated with the fly-wheel element of the "Decelostat,"

Figure 4:
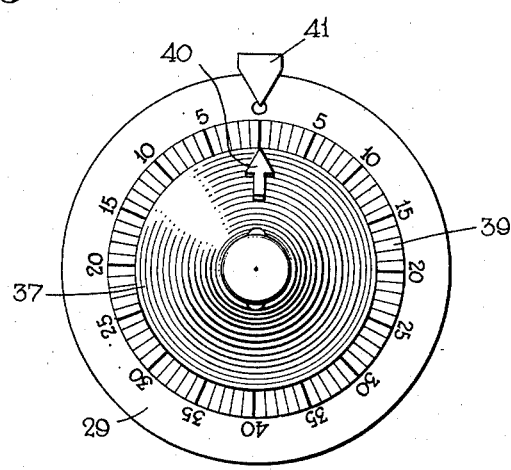
Figure 5:
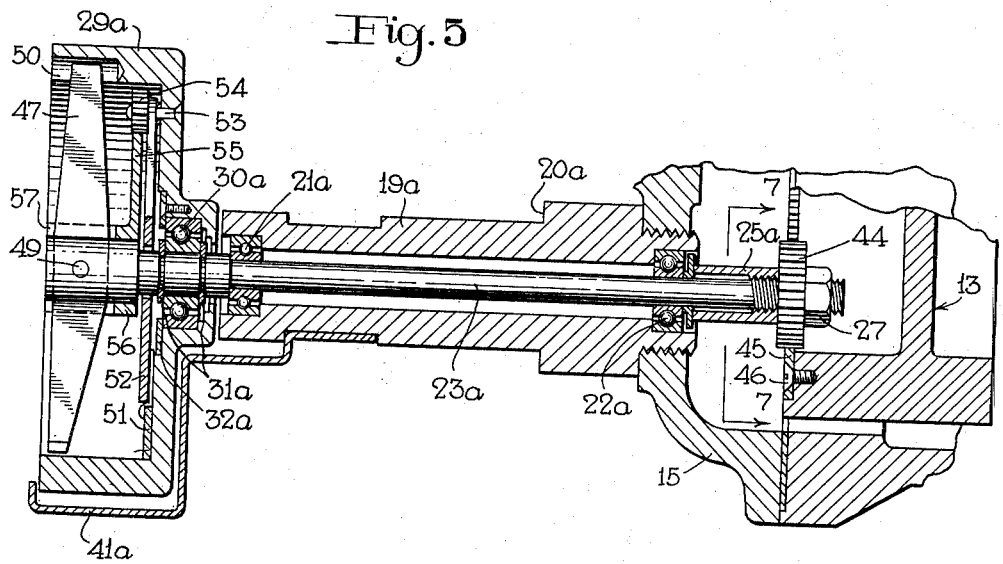
Figure 6:
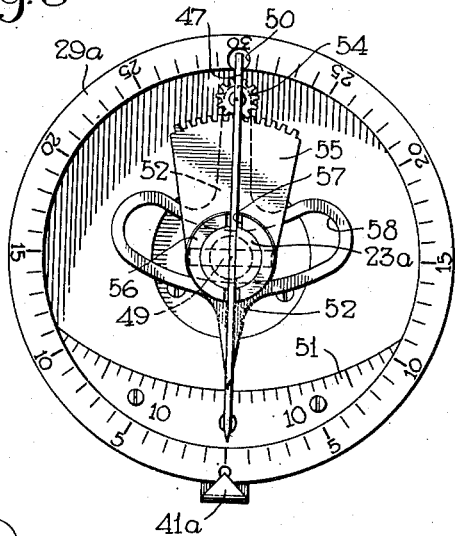
Figure 7:
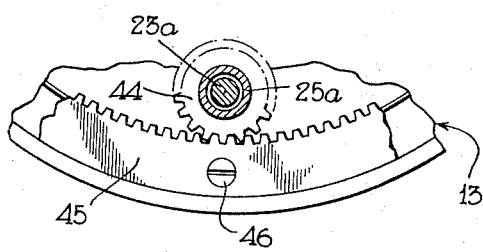

Figure 4 is an enlarged end view showing further details of the embodiment of my testing device shown in Figure 3, Figure 5 is an approximately full-size sectional view of another embodiment of my testing device, Figure 6 is an end view showing further details of the embodiment shown in Figure 5, and Figure 7 is a fragmental sectional view, taken on the line 7—7 of Figure 5, showing further details of construction.

Description

Before describing my novel testing device in detail it is deemed desirable to describe briefly the "Decelostat" to which the testing device is applied. Referring, therefore, to Figures 1 and 2, the "Decelostat" 11 shown is secured to the end of an axle journal casing 12 in place in the usual end cover. The fly-wheel 13 (see Figure 3) of the "Decelostat" is journaled in manner not shown, on a spindle that is in turn journaled in the casing of the "Decelostat" in coaxial relation to the axle (not shown) and connected by a flexible shaft to the end of the axle. At the outer end of the "Decelostat" casing there is embodied a suitable control valve device 14, the operating plunger of which (not shown) extends in coaxial relation to the axle journaled in the axle casing 12. The leaf spring (not shown) of the "Decelostat" is attached at one end to the rim of the fly-wheel and the free end thereof is adapted to engage the end of the operating plunger of the control valve device whenver the axle rotatively decelerates or accelerates at a rate exceeding a certain rate, such as 10 miles per hour per second.

In the outer cover plate 15 of the "Decelostat" are two diametrically spaced circular openings 16, each threaded to receive suitable screw plugs 17, only one of which is shown in Figure 1. These openings 16 serve a dual purpose, namely (1) to enable insertion of an operator's finger or a tool for the purpose of manually rotating the fly-wheel to effect test operation of the control valve device 14 and (2) to receive my novel testing device 18 therein.

Referring particularly to Figures 3 and 4, testing device 18 comprises a tubular casing member 19 threaded at one end to adapt it to be screwed into either one of the threaded openings 16 in the cover plate 15 of the "Decelostat" and having an annular shoulder 20 adjacent the threaded end portion for engaging the outer surface of the cover plate to accurately and fixedly secure the testing device in its operating position with the respect to the fly-wheel 13.

Suitably journaled in the casing member 19, as by two ball-bearing races 21 and 22 at opposite ends thereof respectively, is a shaft or spindle 23. The inner end of the shaft 23 is adapted to extend into the "Decelostat" casing when the tubular member 19 is screwed into the opening 16. A disk or washer 24 of rubber or rubber composition is secured to the inner end of shaft 23 and serves as a drive wheel or roller for frictionally engaging the inner surface of the outer rim of the fly-wheel 13 to effect rotation of the fly-wheel, upon manual rotation of shaft 23 in the manner presently to be described. The rubber roller or wheel 24 may be secured in position on the end of the shaft 23 as by being firmly clamped between the flange on the end of a sleeve 25 which is first screwed over the threaded end of the shaft and a washer 26, against which a securing nut 27 bears.

The inner edge of the rim of the fly-wheel 13 may be beveled slightly at 28, as shown in Figure 3, to enable the rubber wheel 24 to readily slide longitudinally into position on the inner surface of the rim of the fly-wheel when the casing member 19 is screwed into the opening 16.

Journaled at the outer end of the shaft 23, which projects beyond the outer extremity of the casing member 19, is an annular member or hand-wheel 29. As shown in Figure 3, the hand-wheel 29 is journaled on shaft 23 by a ball bearing race 30, the inner ring of which is suitably held in position on the shaft 23 between two split snap rings 31 that engage in corresponding annular grooves in the shaft. The hand-wheel 29 is locked on the outer ring of the bearing race, as by a washer or ring 32 suitably secured to the outer face of the hand-wheel by screws or rivets 33.

The hand-wheel 29 is flexibly and yieldingly connected to shaft 23 through a helical torsion spring 34, one end of which is attached to a lug 35 formed on the ring 32 and the other end of which lockingly engages in a diametrical slot 36 cut longitudinally in the end of the shaft 23.

A conical or bell-shaped member 37 is fixedly secured to the outer end of shaft 23 as by rivet 38 in the manner shown.

Formed on the outer face of the hand-wheel 29 is an annular boss 39 so located as to closely surround the outer periphery of the bell-shaped member 37. A suitable scale is provided on the face of the boss 39, as by cutting uniformly spaced lines therein. As illustrated in Figure 4, eighty lines are cut in the face of the boss 39, the lines being numbered in sets of 5 in opposite directions from a neutral point marked "0" to a point diametrically opposite marked "40." As shown, the scale on boss 39 indicates miles per hour per second directly for a thirty-six inch diameter car wheel. If desired, however, the scale on boss 39 may be an arbitrary scale not necessarily measuring miles per hour per second directly.

It will be understood that if a scale corresponding to a thirty-six inch diameter car wheel is employed, suitable allowance must be made when testing device is used in connection with a car wheel of different diameter. For example, if the testing device is employed in connection with a thirty-three inch diameter wheel, 9% of the scale reading should be subtracted to obtain the actual miles per hour per second registration.

A pointer or indicator 40 is embossed on or attached to the bell-shaped member 37 in a radial position in such a manner that in the free state of the torsion spring 34, the pointer 40 registers with the "0" point of the scale on boss 39.

Also associated with the hand-wheel 29 is a rotatably adjustable pointer 41, shown in Figure 4 as adjusted in register with the "0" point of the scale on the boss 39. The pointer 41 is attached to or formed integral with a circular or substantially circular spring clamp portion which grips the outer surface of the tubular casing 19 in a groove 42 formed for the purpose. The pointer 41 may be adjusted rotatably simply by exerting a rotational force thereon with respect to the tubular member 19. However, the spring clamp of the pointer is so constructed and designed as to firmly grip and position the pointer in a desired fixed position.

Operation

Let it be assumed that my testing device 18 is installed in the opening 16 of a Decelostat casing in the manner shown in the drawings and that the operator desires to check the response of the Decelostat to deceleration or acceleration. To do so, the operator first turns the hand-wheel 29 in either a clockwise or a counterclockwise direction as seen in Figures 1 and 4. Initially, if the fly-wheel of the "Decelostat" is in its floating zone, no rotation of the pointer 40 on the bell-shaped member 37 with respect to the "0" point on the scale will occur for the reason that the rotation of the fly-wheel is unopposed initially and substantially no torsional force is transmitted through the torsion spring 34. When the fly-wheel reaches the extremity of its floating zone and further rotation of the fly-wheel by rotation of the hand-wheel 29 is yieldingly resisted with an increasing force as the hand-wheel is progressively rotated further, the force of resistance to rotation of the fly-wheel will cause a corresponding tensioning of the torsion spring 34 and a consequent relative movement of the pointer 40 on the bell-shaped member 37 with respect to the "0" point on the scale. The operator continues to further rotate the hand-wheel 29 carefully and sensitively until he first detects or senses the initial operation of the control valve device 14 as caused, for example, by the escape of air under pressure controlled by the control valve device. The reading of the pointer 40 on the scale at this point registers the miles per hour per second deceleration or acceleration to which the valve device 14 of the Decelostat is operatively sensitive. For a thirty-six inch diameter car wheel, the reading on the scale should be somewhere between 12 and 17 in order to conform to standard specifications.

After securing a reading on the scale by rotation of the hand-wheel 29 in one direction, such as the clockwise direction, the operator then allows the hand-wheel to be restored to its free position, following which he rotates the hand-wheel 29 in the opposite direction in a manner similar to that described, until such time as he again senses the initial operation of the control valve device 14. The reading of the pointer 40 on the scale in this direction should also be between 12 and 17 miles per hour per second for a thirty-six inch diameter wheel.

Upon analysis, it will be seen that the reading obtained in the manner just described is a direct measure of the acceleration or deceleration rate dynamically effective to cause operation of the control valve device 14, notwithstanding that the "Decelostat" is being tested statically and is not being operated dynamically. The torque manually exerted on the fly-wheel by rotation of the hand-wheel 29 is necessarily equal to the torque dynamically exerted by inertia of the fly-wheel for any selected rate of acceleration or deceleration. This relation may be expressed mathematically as (1) $$T_s = T_d$$

where $T_s$ is the torque manually exerted on the fly-wheel and $T_d$ is the torque dynamically exerted by inertia of the fly-wheel.

As is well known, the torque dynamically effected by inertia of the fly-wheel may be expressed mathematically by the equation (2) $$T_d = J \cdot a$$

where $J$ is the polar moment of inertia of the "Decelostat" fly-wheel expressed in pound-feet-seconds-squared and $a$ is rotary acceleration expressed in radians-per-second-squared.

Since the polar moment of inertia $J$ of the fly-wheel of the "Decelostat" is a constant, the dynamic torque $T_d$ may therefore be expressed mathematically as (3) $$T_d \text{ is proportional to } a$$

Thus in view of the equality of the static torque $T_s$ and the dynamic torque $T_d$, as expressed in Equation 1 above, it follows that (4) $$T_s \text{ is proportional to } a$$

It will thus be seen that the torque manually applied to the hand-wheel 29 and sufficient to effect initial operation of the control valve device 14 is a direct measure of the acceleration or deleceration rate required to effect this result dynamically.

Let is now be assumed that the operator desires to verify the conformity of the "Decelostat" and its parts to design specifications, for example, the thickness of the leaf spring of the "Decelostat," the angle at which the free end of the leaf spring is bent to form a cam, and the clearance space between the leaf spring and the end of the operating plunger of the control valve device. To do this, the operator first turns the hand-wheel 29 in either a clockwise or counterclockwise direction to the point where he senses the initial operation of the control valve device. He then rotatably adjusts the pointer 41 into registration with the pointer 40, in the position on the scale at which he first senses the initial operation of the control valve device after which he continues to rotate the hand-wheel 29 until further rotation of the hand-wheel 29 is prevented by engagement of one of the limit stops on the fly-wheel 13 of the "Decelostat" with a corresponding one of the two transversely mounted rollers carried by the spindle. The spindle it will be understood is suitably locked against rotation if the "Decelostat" is being tested following manufacture and before installation on a car. If the test is being made with the "Decelostat" installed on a car axle journal, the spindle if of course automatically locked against rotation by reason of its connection to the axle of the stationary car.

If there is proper clearance between the leaf spring attached to the fly-wheel of the "Decelostat" and the end of the operating plunger of the control valve device 14, and if the leaf spring itself conforms within tolerance limits to the required thickness, and if the free end of the leaf spring is bent at the proper angle or within tolerance limits of the proper angle, the operator should be able to turn the hand-wheel 29 sufficiently that the number of graduations on the scale of boss 39 between the pointer 41 and the pointer 40 is somewhere within a certain range, such as twenty-three to twenty-eight scale divisions. Taking into consideration the rotational multiplication between the shaft 23 and the fly-wheel 13, due to the difference in diameters of the rubber wheel 24 and the diameter of the fly-wheel, the amount of rotation of the shaft 23, as indicated by the number of scale divisions between the two pointers 40 and 41 following the initial operation of the control valve device 14, is an accurate measure of the angle through which the fly-wheel 13 rotates after the initial operation of the control valve device 14 occurs. The actual angle through which the fly-wheel should rotate after initial operation of the control valve device 14 occurs is of the order of 19.5 degrees.

If, after observing that the response of the "Decelostat" to acceleration or deceleration is satisfactory, the operator of the test device observes that it is possible to rotate the hand-wheel over the certain range of twenty-three to twenty-eight scale divisions following the instant the control valve device is operated, he is reliably informed as to the conformity of the "Decelostat" to design specifications. Actually he need not know anything further than this and he may not be possessed of any knowledge of the construction or the theory of operation of the "Decelostat" itself. It will thus be seen that a relatively unskilled person may be taught in a very few minutes to use my novel testing device.

If, after observing that the response of the "Decelostat" to acceleration or deceleration is satisfactory the operator further observes that he can rotate the hand-wheel 29 only twenty scale divisions following the instant initial operation of the control valve device 14 occurred, it is a definite indication that any one of the previously mentioned defective conditions may exist, that is, the leaf spring may be of insufficient thickness and the clearance between the leaf spring and the end of the operating plunger of the control valve device may be too great, or the free end of the leaf spring may be bent at an angle less than that called for by design specifications.

If, on the other hand, after observing that the response of the "Decelostat" to acceleration or deceleration is satisfactory, the operator observes that he may rotate the hand-wheel thirty scale divisions following the initial unseating or operation of the control valve device, it is a definite indication that the leaf spring of the "Decelostat" is of greater thickness than the value called for by design specifications and that the amount of clearance between the leaf spring and the end of the operating plunger of the control valve device 14 is less than the proper distance called for by design specifications, or that the free end of the leaf spring is bent at an angle greater than the proper angle.

Having obtained a measure of the degree of rotation of the shaft 23 following initial operation of the control valve device 14 in the manner just described for one direction of rotation of the hand-wheel, the operator may then repeat the process for rotation of the hand-wheel in the opposite direction to obtain a similar reading. Such reading should correspond in degree to the reading obtained for the previous direction of rotation of the hand-wheel. If the two readings obtained for opposite directions of rotation of the hand-wheel are not substantially identical, it is an indication that there is some defect in the adjustment or construction of the parts of the "Decelostat."

*Figures 5, 6, and 7*

The embodiment of my novel testing device shown in Figures 5, 6, and 7 is in many respects identical to the previously described embodiment. For simplicity corresponding parts in the two embodiments will be identified by corresponding reference numerals with the suffix *a*, without further description and only the structure different from that of the first embodiment will be described.

As shown in Figures 5 and 7, this embodiment differs from the previous embodiment in providing a spur gear wheel or pinion 44 on the end of shaft 23 in place of the rubber wheel 24 of the previous embodiment, which gear wheel 44 engages a rack sector 45 secured as by a plurality of screws 46 to the outer edge of the rim of the fly-wheel 13, to provide a positive drive connection between the shaft 23 and the fly-wheel 13 independent of friction.

The embodiment shown in Figure 5 differs further from the previous embodiment in providing a hand-wheel 29a differing in configuration from the hand-wheel 29 but similarly rotatively mounted on the shaft 23a by a ball-bearing race 30a. The hand-wheel 29a is flexibly and resiliently connected to shaft 23a by a flat leaf spring 47. The leaf spring 47 extends diametrically from the shaft 23a to the rim of the hand-wheel 29a, being secured midway between its ends in a longitudinal slot formed in the end of the shaft 23a, as by a pin or rivet 49, and having one end engaging with a close fit between two knife edges formed by a circular hole or bore 50 drilled longitudinally into the rim of the fly-wheel 29a. The opposite end of the leaf spring 47 is free and serves as a pointer in the manner hereinafter described.

In order to indicate the degree of rotational movement of the hand-wheel 29a with respect to the shaft 23a an arcuate scale having uniform scale divisions thereon is formed on the outside of the web of the hand-wheel or on a separate arcuate plate member 51 suitably bonded or attached to the web of the hand-wheel. A pointer or indicating member 52 is provided, one end of which terminates closely adjacent the inner radius of the scale member 51 and the other end of which is pivoted on a pin or rivet 53 secured in a suitable hole drilled through the web of the hand-wheel 29a. Secured to the upper end of the pointer 52, as by brazing or welding is a small pinion 54 having a central hole through which the pin 53 extends.

Cooperating with the pinion 54 is a gear sector 55 that is formed integrally with or attached to a sleeve member 56. Sleeve member 56 fits longitudinally over the end of the shaft 23a and is secured in fixed position thereon by the rivet 49 which extends transversely through the walls of the sleeve member 56. A longitudinal slot 57 is cut diametrically in the sleeve member 56 to permit the opposite arms of leaf spring 47 to extend outwardly therethrough.

The pointer 52 is constructed or formed midway between the ends thereof in such a manner as to provide an arcuate slot 58 through which shaft 23a extends so as to permit the pointer 52 to be swung laterally to either side of a diametrical or central position.

It will thus be seen that when the hand-wheel 29a is rotated in a manner to cause rotation of the hand-wheel with respect to the shaft 23a the pinion 54 is correspondingly rotated and the pointer 52 is correspondingly displaced to one or the other side of a central position, indicated on the scale member 51 by "0." The scale divisions on the scale member 51 may be suitably numbered symmetrically on opposite sides of the "0" point to directly indicate miles per hour per second at which the initial response of the pilot valve device 14 occurs.

It will be observed that the gear sector 55 and pinion 54 constitute a motion-amplifying means whereby a small angle of relative motion between the hand-wheel 29a and shaft 23a is multiplied into a greater angle of movement of the pointer 52 proportional thereto, thereby increasing the visibility and accuracy of the reading obtained on the scale.

The embodiment shown in Figure 5 further comprises a rotatably adjustable pointer 41a, corresponding to the pointer 41 of the previous embodiment and similarly secured to the tubular casing 19a of the test device. The outer end of the pointer 41a projects radially toward the shaft 23a to cooperate with an annular scale suitably marked on or attached to the outer end of the rim of the hand-wheel 29a. This annular scale corresponds to the single scale provided on the hand-wheel of the previous embodiment, except that as will be seen in Figure 6, it is divided into sixty scale divisions numbered in sets of 5 from a point marked "0" up to a point marked "30" on either side of the "0" point. The size of each scale division on this scale is determined by the gear ratio between the spur gear 44 and the gear sector 45. In the embodiment shown, this ratio is assumed to be a six-to-one ratio. By thus dividing the complete annular scale into sixty divisions, it will be apparent that each scale division represents one degree of rotation of the fly-wheel 13, as will be more clearly explained presently.

The operation of the test device shown in Figures 5, 6 and 7 will be understood from the description of the operation of the previous embodiment. It is deemed unnecessary therefore to describe the operation of this embodiment in detail. Briefly, however, it may be pointed out that the indication on the scale member 51 is employed in this embodiment when taking a reading of the acceleration or deceleration at which the initial response of the control valve device of the "Decelostat" occurs while the annular scale on the end of the rim of the hand-wheel 29a is employed when verifying or checking the conformity of the "Decelostat" to design specifications. In the latter case, the pointer 41a is adjusted rotatably into radial registry with the free or pointer end of leaf spring 47 at the point at which the initial response of the control valve device 14 occurs due to rotation of the hand-wheel. Upon further rotary displacement of the hand-wheel beyond this point to the point where further rotation is stopped at the instant the fly-wheel 13 reaches the limit of its rotary movement with respect to the spindle on which it is mounted the numbers of scale divisions on the annular scale between the pointer 41a and the free or pointer end of leaf spring 47 indicates the actual number of degrees through which the fly-wheel 13 is rotated following initial unseating of the control valve device 14.

Having now described my invention, what I claim as new and desire to secure by Letters Patent is:

1. A testing device for determining the conformity to design specifications of the parts of a rotary inertia device of the type including a control device and a rotary inertia element dynamically responsive to acceleration and deceleration of a movable member at a rate exceeding a certain rate to effect operation of the control device, said testing device comprising a non-rotative member adapted to be removably secured in a fixed rotative position with relation to the rotary inertia device, a shaft journaled in said non-rotative member, a driving wheel fixed on said shaft for cooperating with the rotary inertia element of the rotary inertia device to effect rotation thereof in response to rotation of the shaft while the movable member is stationary, a wheel member journaled on said shaft, resilient means connecting said wheel member and said shaft through which a torque force applied to said wheel member is transmitted to said shaft and whereby relative rotational movement of the wheel member with respect to the shaft is effected in accordance with the degree of torque exerted on said shaft, an annular scale on said wheel member, an indicating member attached to said shaft and cooperating with said scale for indicating the degree of rotary displacement of the wheel member with respect to said shaft, and a rotarily adjustable indicating element carried by said non-rotative member adapted to be rotarily adjusted to a position corresponding to the particular acceleration or deceleration at which the control device of the rotary inertia device is initially operated and adapted to cooperate with the indicating element fixed on said shaft and with said annular scale in a manner to indicate the angular degree of rotation of said shaft following the initial response of the control device of the rotary inertia device.

2. A device for statically determining the operative response of a rotary inertia device which in normal manner of operation is dynamically responsive to acceleration and deceleration, said device comprising a non-rotative stationary support, a shaft journaled in said support, a driving wheel fixed on said shaft adapted to engage a cooperating portion of the rotary inertia element of said rotary inertia device to effect rotation thereof in response to rotation of said shaft, a manually rotated member rotarily mounted on said shaft and adapted to be rotated in either direction with respect to said shaft, a radially disposed leaf spring element connecting said shaft and said manually rotated member to provide a resilient yielding driving connection therebetween whereby rotary displacement of the manually rotated member with respect to said shaft is effected to a degree proportional to the torque force applied to rotate said manually rotated member, a scale on said manually rotated member, an indicating member pivoted on said manually rotated member and cooperating with said scale, and means fixed to said shaft and rotatable therewith cooperating with said indicating member for operatively moving said indicating member in either direction from a central position with respect to said scale in proportion to the degree of rotative movement of said manually rotated member with respect to said shaft.

3. A portable testing device comprising a tubular casing adapted to be removably attached in fixed relation to a device to be tested, a shaft journaled in said tubular casing and projecting beyond the opposite ends of said casing, a driving wheel fixed on one end of said shaft for cooperation in driving relation with the rotary element of the device to be tested, a hand-wheel rotarily mounted on the opposite end of said shaft adjacent the end of the tubular casing, a radially disposed leaf spring element connecting said shaft and said hand-wheel for positioning said hand-wheel normally in a certain rotary position with respect to said shaft and yieldingly flexible to permit a limited amount of relative rotary movement between the hand-wheel and the shaft, upon application of a torque force to said hand-wheel, in accordance with the degree of the torque force exerted on the hand-wheel, a scale on said hand-wheel, an indicating element pivotally mounted on said hand-wheel and cooperating with said scale, and pinion and gear means so connecting said shaft and said indicating element as to effect an amplified movement of said indicating element in predetermined ratio to the degree of relative rotary movement between the hand-wheel and the shaft.

4. A portable testing device comprising a tubular casing adapted to be removably attached in fixed relation to a device to be tested, a shaft journaled in said tubular casing and projecting beyond the opposite ends of said casing, a driving wheel fixed on one end of said shaft for cooperation in driving relation with the rotary element of the device to be tested, a hand-wheel rotarily mounted on the opposite end of said shaft adjacent the end of the tubular casing, a spring member connecting said hand-wheel and said shaft in a manner to normally position the hand-wheel in a certain position rotarily with respect to the shaft and to yieldingly transmit to the shaft a torque force applied to the hand-wheel and at the same time yieldingly permit relative rotation of the hand-wheel on the shaft in accordance with the degree of the torque force applied to the hand-wheel, a first scale on said hand-wheel, a movable indicating element cooperating with said first scale, means actuated in accordance with the degree of relative rotary movement between the hand-wheel and said shaft for indicating directly a desired characteristic of the device to be tested which is proportional to the torque exerted on said shaft, a second scale on said hand-wheel, a second indicating element carried by said shaft and cooperating with said second scale, and a third indicating element carried by said tubular casing and rotarily adjustable to different fixed positions with respect thereto and cooperating with said second scale and said second indicating element for indicating any predetermined range of rotary movement of said shaft with respect to said tubular casing.

GEORGE K. NEWELL.

REFERENCES CITED

The following references are of record in the file of this patent:

UNITED STATES PATENTS

| Number | Name | Date |
|---|---|---|
| 832,064 | Keeler | Oct. 2, 1906 |
| 1,775,075 | Watson et al. | Sept. 2, 1930 |
| 1,775,541 | Zechlin | Sept. 9, 1930 |
| 2,013,938 | Williams | Sept. 10, 1935 |
| 2,133,763 | Williams | Oct. 18, 1938 |
| 2,137,066 | Smith | Nov. 15, 1938 |
| 2,260,358 | Zimmerman | Oct. 28, 1941 |
| 2,337,546 | Cox | Dec. 28, 1943 |
| 2,352,906 | Lyons | July 4, 1944 |
| 2,365,419 | Lockheed | Dec. 19, 1944 |